C. A. ANDERSON.
MECHANISM FOR CURING AND PREPARING GRASSES FOR PACKING PADS AND UPHOLSTERY PURPOSES.
APPLICATION FILED SEPT. 3, 1910.
1,005,764.
Patented Oct. 10, 1911.
2 SHEETS—SHEET 1.
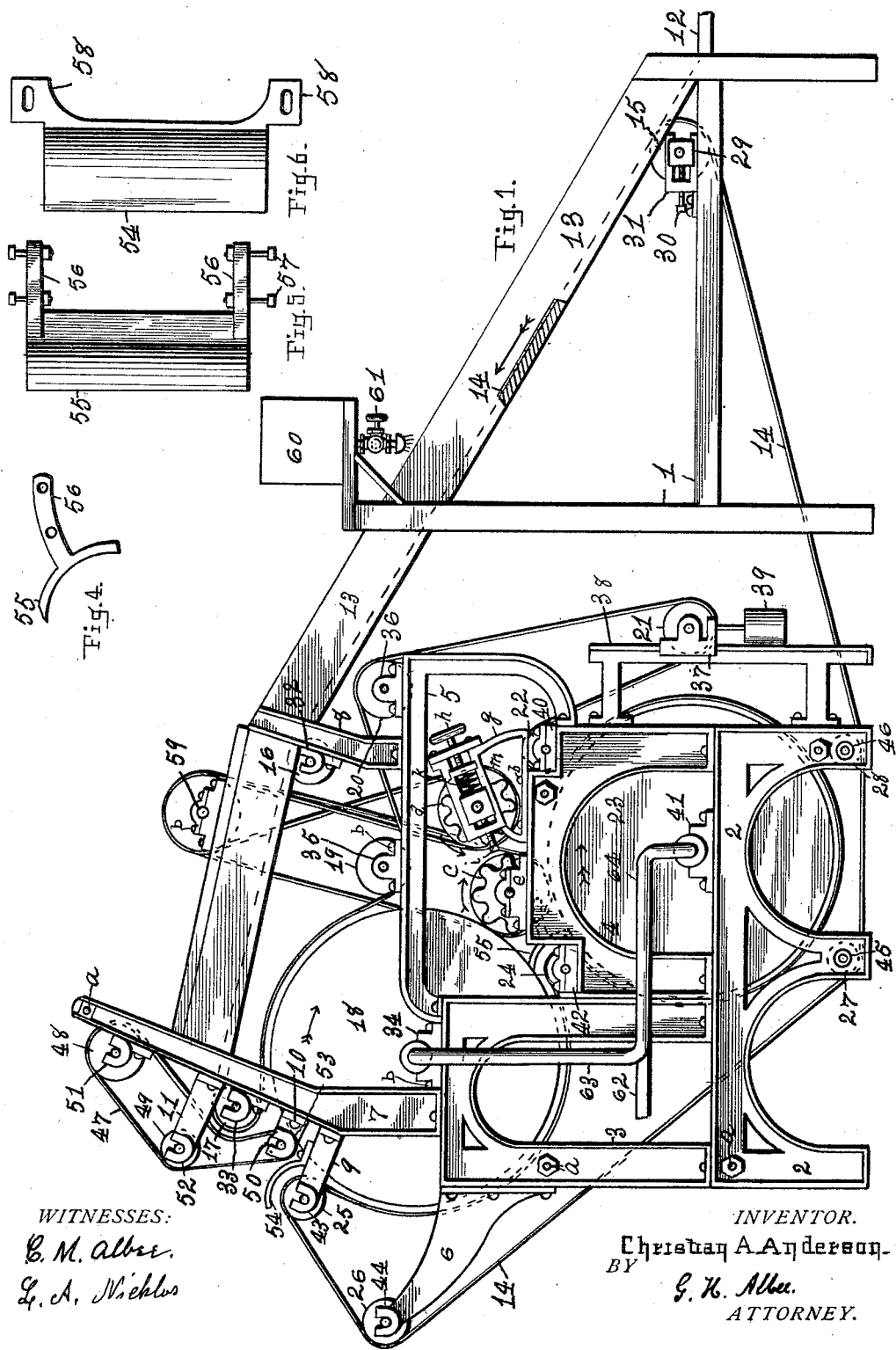
WITNESSES:
C. M. Albee.
L. A. Nichols
INVENTOR.
Christian A. Anderson.
BY
G. H. Albee.
ATTORNEY.

C. A. ANDERSON.
MECHANISM FOR CURING AND PREPARING GRASSES FOR PACKING PADS AND UPHOLSTERY PURPOSES.
APPLICATION FILED SEPT. 3, 1910.
1,005,764.
Patented Oct. 10, 1911.
2 SHEETS—SHEET 2.
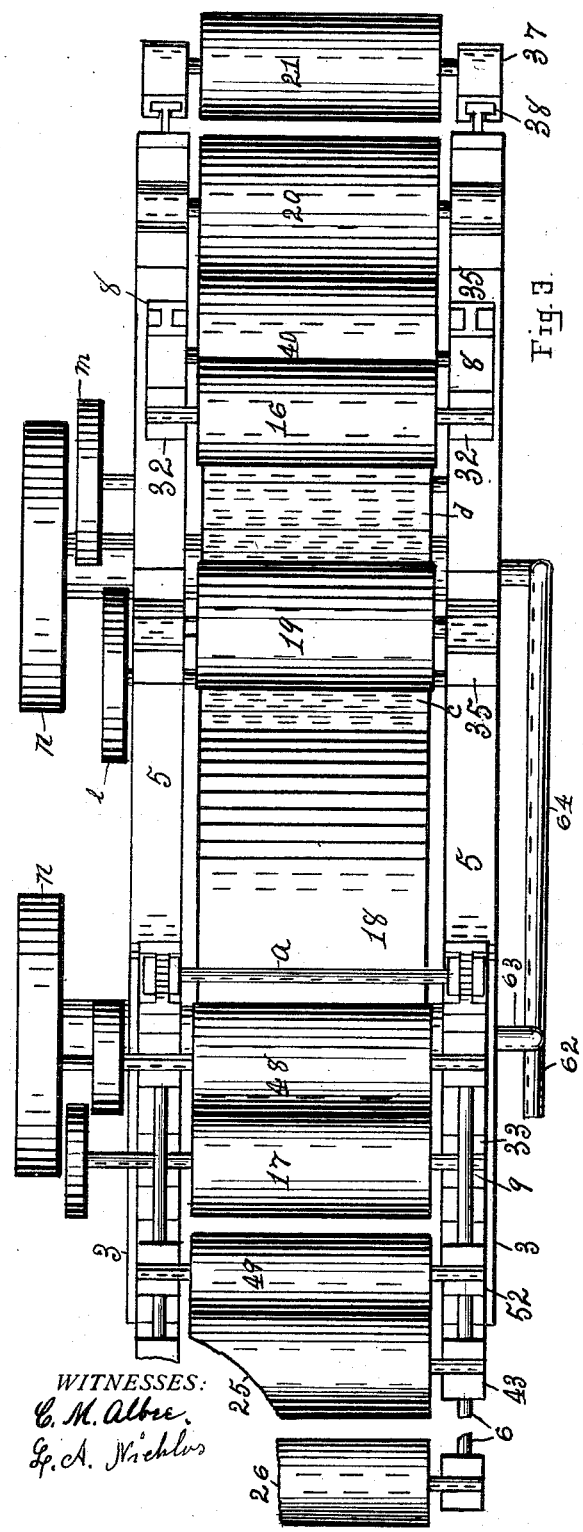
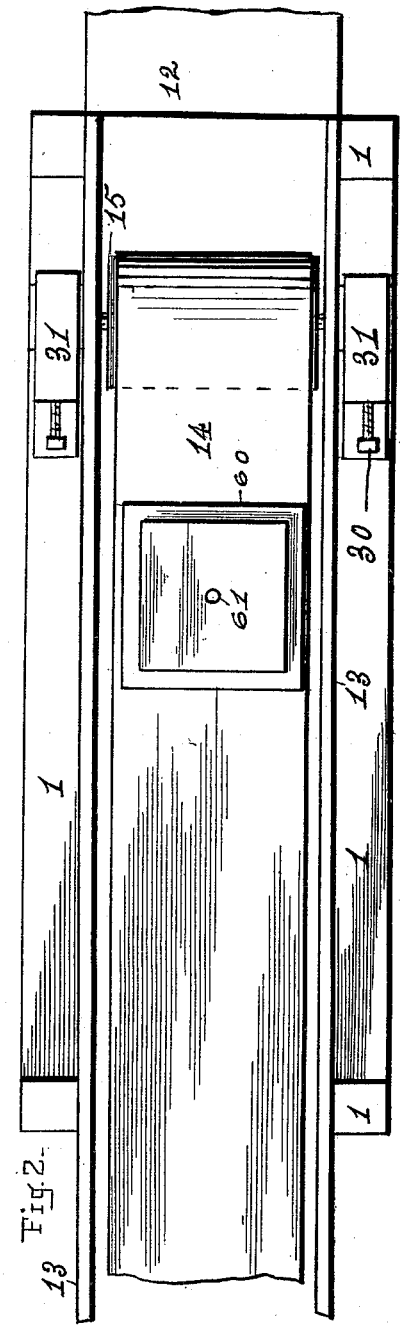
WITNESSES:
C. M. Albee.
G. A. Nichols
INVENTOR.
Christian A. Anderson
BY
G. H. Albee
ATTORNEY.

UNITED STATES PATENT OFFICE.

CHRISTIAN A. ANDERSON, OF APPLETON, WISCONSIN, ASSIGNOR OF ONE-HALF TO APPLETON MACHINE COMPANY, OF APPLETON, WISCONSIN.

MECHANISM FOR CURING AND PREPARING GRASSES FOR PACKING-PADS AND UPHOLSTERY PURPOSES.

1,005,764.  Specification of Letters Patent.  Patented Oct. 10, 1911.

Application filed September 3, 1910. Serial No. 580,371.

*To all whom it may concern:*

Be it known that I, CHRISTIAN A. ANDERSON, a citizen of the United States, residing at Appleton, in the county of Outagamie and State of Wisconsin, have invented a new and useful Mechanism for Curing and Preparing Grasses for Packing-Pads and Upholstery Purposes, of which the following is a specification.

My invention is designed for preparing grass after it has been cut and dried, coarse marsh grass is designed to be used principally, by again dampening it and subjecting it to the action of a chemically impregnated liquid, to hot smooth rolls and longitudinally corrugated rolls, and it comprises a suitable frame for supporting the mechanism, a sprinkling tank, a pair of smooth faced heated rolls, a pair of longitudinally corrugated rolls and a plurality of conveyer belts for delivering the grass to the several rolls, and away from the mechanism when its treatment has been completed.

The mechanism is shown in the accompanying drawings, in which,—

Figure 1 is a side elevation of the entire mechanism. Fig. 2 is a plan of the first section of the frame and its mechanism, a tank and its support above the part shown being omitted. Fig. 3 is a plan of the last section and the remaining mechanism, the conveyer sides, conveyer belt and a countershaft thereon being omitted. Fig. 4 is an end view of a doctor plate which is used between the two heated rolls for changing the direction in which the grass is being fed. Fig. 5 is a plan view of the same. Fig. 6 is a plan view of another doctor plate which is used later in the conveyance of the grass. Fig. 1 is upon a smaller scale than the others.

Similar numerals and letters indicate like parts in the several views.

1, indicates the first section frame of the machine, which may be of wood. The second section, which is represented to be of cast iron, consists of several parts made in pairs for the opposite sides, consisting of base pieces 2, two side sections 3 and 4 skeleton side pieces 5, bracket arms 6, standards 7 and 8 mounted upon the frame pieces, and journal box bracket arms 9, 10 and 11, are secured to the standard 7. The frame sections and standard 7, are spaced apart and held together with bolts $a$, and two nuts in a well known manner, one nut inside of the frame piece and the other outside, but it should be understood that any suitable style of frame may be used. A table 12, is provided, only a short piece being shown, but it may be of any length and width which the grass to be treated requires, upon which the grass is to be placed and fed by the operator into the conveyer channel 13.

The conveyer consists of an endless belt 14, for which a suitable fabric is best adapted, and in the present case is arranged to run around the first roll 15, upward to the carrying roll 16, on around the upper roll 17, to which roll the belt runs in an open topped channel, thence it runs downward over the hot roll 18 and under the roll 19 and over the roll 20, thence downward around the slack take-up roll 21, thence upward around the roll 22, and downward around the second hot roll 23, then around the roll 24, thence upward along the first hot roll and around the roll 25 and downward around the roll 26, returning under the rolls 27 and 28 to the place of starting at the roll 15. The roll 15 is arranged for revolution in journal boxes 29, having an adjusting screw 30, in their frames 31. The rolls 16 and 17 are arranged for revolution in journal boxes 32 and 33, respectively, the hot roll 18, in boxes 34, the rolls 19 and 20, in boxes 35 and 36 respectively, the roll 21, in the boxes 37, which boxes are arranged to slide upon ways 38, and are provided with weights 39, for taking up the slack in the belt 14. The roll 22 is arranged in journal boxes 40, the lower hot roll in boxes 41, the roll 24 in boxes 42, the roll 25 is boxes 43 upon the bracket arms 9, and the roll 26 in boxes 44 upon the arms 6, and the rolls 27 and 28 in boxes 45 and 46 in the feet of section 2 of the frame. For assisting in directing the grass as it passes over the roll 17, to follow around the upper hot roll, enough endless belt conveyer belt 47, is arranged to run over and around rolls 48, 49 and 50, which rolls are arranged to run in journal boxes 51, 52 and 53 which are upon the standards 7 and bracket arms 11 and 10, respectively.

At two points, doctor plates 54 and 55, are arranged for changing the direction of travel of the material being treated. The doctor plate 55 is shown in end and plan views in Figs. 4 and 5 respectively. The plate is provided with arms 56, which are intended to be bolted to, and between the side frames 4, with bolts 57, at a point just over the roll 24, and when properly adjusted in position will turn the course of the grass from the lower to the upper hot roll. The doctor plate 54, may be the same as 55, or be provided with ears 58, for being bolted to the bracket arm 9, as shown in Fig. 1.

b, indicates bolts in the various places where bolts are required as for securing the skeleton frames g, to the side sections 4, and the several caps to their journal boxes in Fig. 1.

The corrugated rolls c and d, are mounted for revolution, the roll c in boxes e, which are secured to the frame sections 4, and the roll d, in boxes f, which are arranged to slide upon an incline upon the skeleton frames g, which frames are bolted upon the frame sections 4. The journal boxes f are arranged to slide toward and from the roll c, and are provided with adjusting screws h and i, and a spring k for each box, for allowing bunches of grass of different thickness to pass between the rolls. These rolls may be driven from any convenient source of power, as can the various conveyer rolls, some of which must be driven while others need not be, as will be evident to a mechanic, those upon which the conveyer belt is wrapped around the most, such as the rolls 15, 17, 22 and 24, being the ones to be driven.

In the present case the rolls c and d, are driven from a counter shaft 59, with a straight belt to a pulley l, on one roll and a crossed belt to a pulley m, on the other roll for driving them in opposite directions, arrows indicating the direction in which they, the hot rolls and conveyer belts are to run. The hot rolls can be driven from any suitable source of power by means of belts upon their pulleys n, they running in the same direction.

At an early date in the ascending course of the grass, a tank 60 is arranged, it being provided with a sprinkling nozzle 61, from which lime water, or other liquid can be showered upon the grass, before it reaches the heated rolls. The rolls 18 and 23 are to be heated from some steam source of supply, through the pipe 62 and delivered to the roll 18 through the branch pipe 63, and to the roll 23 through the pipe 64.

The operation of the mechanism is as follows:—A quantity of grass being placed upon the table 12, it is fed to the conveyer by the operator, a little at a time, the quantity fed of course depending in a measure upon the rate of travel of the conveyer belt. In its ascending course it is sprinkled with lime water, or such other liquid as may be used. Upon its arriving at the roll 17 it is met by the conveyer belt 47 and carried under the roll 17, bringing its upper wet side in contact with the heated surface of the roll 18, the heat from which produces steam from the liquid, which ascends through the grass and makes it soft and pliable. It is taken along and delivered to, and run between the corrugated rolls c and d and crimped and made pliable, in its passage. It is then taken as it drops from the rolls c and d, and carried nearly around the lower hot roll and then transferred by means of the roll 24 and doctor plate 55, to the upper hot roll, which it passes nearly one half around, becoming in its travel thoroughly dried, when its course is arrested by the doctor plate 54, and it is dropped from the conveyer a finished material ready for use.

Having described my invention, what I claim and desire to secure by Letters Patent, is,—

1. In a machine for curing and preparing grass for packing and upholstery purposes, a suitable frame for supporting the mechanism, a table upon which to spread the grass to be treated, a conveyer channel arranged to extend in an inclined direction upward, an endless conveyer belt arranged for running in said conveyer channel, and to feed the grass to be treated, a tank provided with a sprinkling nozzle arranged above said conveyer channel for wetting the grass, a roll at the upper end of said conveyer channel over which said conveyer belt is arranged to run and continue downward, a second conveyer belt arranged to run in a downward direction across the path of the first named conveyer belt and to turn the upper wet side of the grass to be treated downward, two revoluble heated rolls around a portion of whose surfaces the grass is arranged to run, and two longitudinally corrugated unheated rolls, between which the grass is to be fed for crimping the grass.

2. In a machine for curing and preparing grass for packing and upholstery purposes, a suitable frame for supporting the mechanism, a table upon which to spread the grass to be treated, a conveyer channel arranged to extend in an inclined direction upward, a liquid holding tank provided with a sprinkling nozzle mounted above said channel, endless belt conveyers arranged to carry the grass up said incline and to turn the upper wet side of the grass downward and to deliver the grass to the several heated and other rolls by which it is to be acted upon, a smooth faced revoluble heated roll over a portion of its outer surface of which the wet side of the grass is fed, two longitudinally corrugated surface revoluble rolls, one of which is adjustable toward and from the other, between which the grass is fed, partly by gravity, for crimping the grass, a second smooth faced revoluble heated roll, nearly around which the grass is fed, means for supplying heat to said smooth faced rolls, a roll in combination with a doctor plate arranged between the two heated rolls for changing the direction of feed of the grass from the second to the first named heated roll, nearly half around the latter of which the grass is fed, and a second roll and doctor plate near the upper surface of the first named heated roll for stopping the upward feed of the grass and delivering it as a product ready for use.

3. In a machine for curing and preparing grass for packing and upholstery purposes in which the grass is subjected to the drying action of smooth faced revoluble heated rolls and the crimping action of longitudinally corrugated and unheated revoluble rolls, a suitable frame for supporting the mechanism, a pair of heated rolls arranged for revolution thereon, means for supplying heat to said rolls, a pair of longitudinally corrugated rolls arranged to revolve toward each other mounted on said frame, a table upon which the grass to be treated may be spread, a channel arranged upon an incline upward from said table, endless conveyer belts arranged for feeding the grass to the rolls upon which it is to be acted upon, a liquid holding tank arranged above said belt near said table, a sprinkling nozzle arranged to sprinkle said grass with the liquid in said tank, and means for presenting the upper wet side of the grass to the surface of the aforesaid heated rolls and between the corrugated rolls for being crimped by them.

CHRISTIAN A. ANDERSON.

Witnesses:
NEH JENSON,
H. L. OBERLY.

Copies of this patent may be obtained for five cents each, by addressing the "Commissioner of Patents, Washington, D. C."